United States Patent
Osipov (10) Patent No.: US 10,963,319 B2
(45) Date of Patent: Mar. 30, 2021

(54) ENHANCING PRIVACY OF SENSOR DATA FROM DEVICES USING EPHEMERAL COHORTS

(71) Applicant: International Business Machines Corporation, Armonk, NY (US)

(72) Inventor: Kirill M. Osipov, Ormond Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1486 days.

(21) Appl. No.: 14/989,447

(22) Filed: Jan. 6, 2016

(65) Prior Publication Data

US 2017/0193241 A1    Jul. 6, 2017

(51) Int. Cl.
*G06F 9/54*     (2006.01)
*G06F 21/62*    (2013.01)

(52) U.S. Cl.
CPC .......... *G06F 9/542* (2013.01); *G06F 21/6254* (2013.01)

(58) Field of Classification Search
CPC ......... G06F 17/30; H04N 5/4446; G06N 5/00
See application file for complete search history.

(56) References Cited

U.S. PATENT DOCUMENTS

| | | | |
|---|---|---|---|
| 6,038,315 A | 3/2000 | Strait et al. | |
| 7,986,809 B1* | 7/2011 | Funk | G06K 9/3241 342/29 |
| 8,423,791 B1 | 4/2013 | Yu et al. | |
| 8,571,519 B2 | 10/2013 | Ginzboorg | |
| 9,087,216 B2 | 7/2015 | LaFever et al. | |
| 2006/0004663 A1 | 1/2006 | Singhal | |
| 2006/0010206 A1* | 1/2006 | Apacible | H04M 3/436 709/205 |
| 2007/0233668 A1* | 10/2007 | Osipov | G06F 16/907 |
| 2009/0254971 A1* | 10/2009 | Herz | G06Q 30/02 726/1 |
| 2012/0035971 A1* | 2/2012 | Friedlander | G06Q 10/06311 705/7.14 |
| 2012/0222083 A1 | 8/2012 | Vaha-Sipila et al. | |

(Continued)

OTHER PUBLICATIONS

Wireless sensor networks for personal health monitoring: Issues and an implementation: Milenkovic, 2006, computer communications 29 (2006).*

*Primary Examiner* — Li B. Zhen
*Assistant Examiner* — Peter Coughlan
(74) *Attorney, Agent, or Firm* — Robert A. Voigt, Jr.; Winstead PC (57) ABSTRACT

A method, system and computer program product for enhancing privacy of event data. Event sensor data (e.g., body temperature, heart rate data) is received and analyzed by a subscriber to form a probability of assigning a user identity to the received event sensor data. The user of the event sensor data is then assigned with a temporary membership to a cohort (related group of users that share common characteristic(s) or experience(s)) to hide the identity of the user in response to the probability of assigning the user identity to the received event sensor data exceeding a threshold. Actions may then be performed based on the temporary membership to the cohort in order to ensure that the probability of assigning a user identity to the received event sensor data does not exceed the threshold. In this manner, privacy of the user's sensitive data is enhanced.

24 Claims, 3 Drawing Sheets

(56) References Cited

U.S. PATENT DOCUMENTS

| | | | |
|---|---|---|---|
| 2012/0294532 A1* | 11/2012 | Morris | G06F 16/29 |
| | | | 382/195 |
| 2013/0325779 A1* | 12/2013 | Shahshahani | G06N 5/00 |
| | | | 706/46 |
| 2014/0156308 A1* | 6/2014 | Ohnemus | G06F 19/3418 |
| | | | 705/3 |
| 2014/0180024 A1 | 6/2014 | Stivoric et al. | |
| 2015/0018020 A1 | 1/2015 | Elovici et al. | |
| 2015/0039388 A1* | 2/2015 | Rajaraman | G06Q 30/0222 |
| | | | 705/7.29 |

\* cited by examiner

ENHANCING PRIVACY OF SENSOR DATA FROM DEVICES USING EPHEMERAL COHORTS

TECHNICAL FIELD

The present invention relates generally to sensor data used for the Internet of Things, and more particularly to enhancing the privacy of sensor data from devices (e.g., wearable devices) using ephemeral cohorts.

BACKGROUND

Due to the rapid growth of sensor data from devices (e.g., wearable devices) used for the Internet of Things (IoT), there has been an increase in the potential for commercializing the personalized data streamed by these devices. The Internet of Things is a network of physical objects or "things" embedded with electronics, software, sensors, and network connectivity, which enables these objects to collect and exchange data. The Internet of Things allows objects to be sensed and controlled remotely across existing network infrastructure, creating opportunities for more direct integration between the physical world and computer-based systems, and resulting in improved efficiency, accuracy and economic benefit.

Unfortunately, users have concerns about the privacy of the sensor data, which may include sensitive data (e.g., health details, location), thereby impeding the potential for commercialization. As a result, attempts have been made to safeguard the user's sensitive data, such as by storing the data in encrypted form. However, encryption requires computing and technical complexity overhead that is not economical in certain business cases.

Alternatively, a user's sensitive data may be safeguarded by utilizing anonymous identifiers. For example, in some businesses, such as businesses in sales and marketing, it may not be necessary to store personally identifiable information, such as the user's name, address, social security number, etc., alongside the sensitive data. As a result, such businesses may employ anonymizing techniques, such as utilizing pseudonyms or anonymous identifiers, as opposed to the user's personal identifiable information, in connection with the sensitive data.

However, with the proliferation of large volumes of sensor data (e.g., location, elevation, velocity, biological state (e.g., body temperature, heart rate)), a user can be "de-anonymized" by deducing the identity of the user from the patterns in the sensor data.

As a result, there is not currently a means for ensuring the privacy of sensor data, such as data from wearable devices, by preventing the de-anonymizing of the user.

BRIEF SUMMARY

In one embodiment of the present invention, a method for enhancing privacy of event sensor data comprises receiving event sensor data. The method further comprises analyzing the received event sensor data to form a probability of assigning a user identity to the received event sensor data. The method additionally comprises assigning, by a processor, a user of the event sensor data with a temporary membership to a cohort to hide an identity of the user in response to the probability of assigning the user identity to the received event sensor data exceeding a threshold and in response to the received event sensor data not being assigned to an existing identifier of any cohort. Furthermore, the method comprises performing actions, by the processor, based on the temporary membership to the cohort in response to the probability of assigning the user identity to the received event sensor data exceeding the threshold.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for enhancing privacy of event sensor data. In one embodiment of the present invention, event sensor data (e.g., body temperature, heart rate data) is received by a subscriber who has subscribed with a messaging system to receive such information from a publisher. The received event sensor data is analyzed to form a probability of assigning a user identity to the received event sensor data. That is, the subscriber analyzes the received event sensor data to determine the likelihood of identifying the user whose sensitive data is received, such as through random guessing. The user of the event sensor data is then assigned with a temporary membership to a cohort in response to the probability of assigning the user identity to the received event sensor data exceeding a threshold and in response to the received event sensor data not being assigned to an existing identifier of a cohort. A "cohort," as used herein, refers to a related group of users that share one or more common characteristics or experiences within a defined timespan. A user may be temporarily assigned to a cohort to hide the identity of the user. Actions may then be performed based on the temporary membership to the cohort in order to ensure that the probability of assigning a user identity to the received event sensor data does not exceed a threshold. For example, actions include adjusting the scale of data gathered from the sensors of the publisher. In this manner, by performing such actions as well as assigning a user to a temporary membership of an ephemeral cohort, privacy of the user's sensitive data is enhanced by hiding the user's identity as well as ensuring that the probability of assigning a user identity to the received event sensor data does not exceed a threshold.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
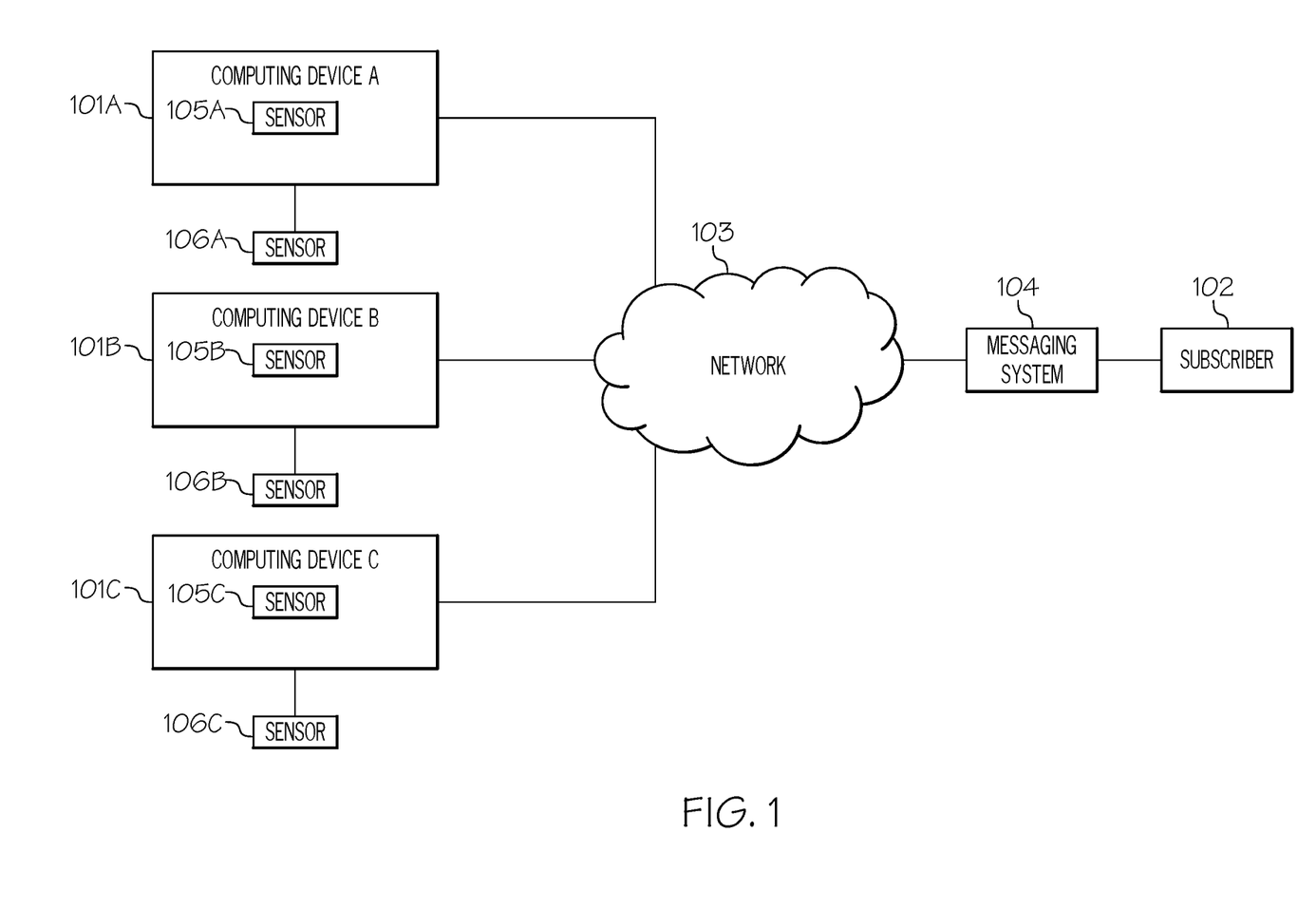
FIG. 1 illustrates a communication system configured in accordance with an embodiment of the present invention.

Referring now to the Figures in detail, FIG. 1 illustrates a communication system 100 for practicing the principles of the present invention in accordance with an embodiment of the present invention. Communication system 100 includes computing devices 101A-101C (identified as "Computing Device A," "Computing Device B," and "Computing Device C," respectively, in FIG. 1) (also referred to herein as the "publishers") connected to a subscriber 102 via a network 103 and a messaging system 104. Computing devices 101A-101C may collectively or individually be referred to as computing devices 101 or computing device 101, respectively.

Network 103 may be, for example, a local area network, a wide area network, a wireless wide area network, a circuit-switched telephone network, a Global System for Mobile Communications (GSM) network, Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

Computing device 101 may be any type of computing device (e.g., portable computing unit, Personal Digital Assistant (PDA), smartphone, laptop computer, mobile phone, navigation device, game console, desktop computer system, workstation, Internet appliance and the like) configured with the capability of publishing messages (event sensor data) to messaging system 104 via network 103 to be delivered to interested subscriber(s) 102 (only one is shown in FIG. 1). Event sensor data may be generated from both internal and external sensors. That is, event data may be generated from various event sources, such as a heart rate monitor, a global positioning system, a smart thermostat system and an appliance. Such events may be detected by sensors embedded within computing device 101, such as shown by sensors 105A, 105B and 105C of computing devices 101A-101C, respectively, or external to computing device 101, such as shown by sensors 106A, 106B and 106C of computing devices 101A-101C, respectively. Sensors 105A-105C may collectively or individually be referred to as sensors 105 or sensor 105, respectively. Furthermore, sensors 106A-106C may collectively or individually be referred to as sensors 106 or sensor 106, respectively. For example, the user of computing device 101A may be wearing a wearable device (not shown in FIG. 1) with a sensor (e.g., sensor 106A) that senses the heart rate of the user. While FIG. 1 illustrates a single sensor (e.g., sensor 105A) embedded within computing device 101 (e.g., computing device 101A) as well as a single sensor (e.g., sensor 106A) external to computing device 101 (e.g., computing device 101A), computing device 101 may contain any number of embedded sensors 105 as well as connected to any number of external sensors 106.

In one embodiment, these messages (published event sensor data) may contain a topic and some data content. As a result, subscriber 102 may provide ahead of time, a criterion, also referred to as a subscription, to messaging system 104 that specifies the information, based on published messages, that messaging system 104 is required to deliver to that subscriber 102 in the future. In one embodiment, publishers 101 and subscribers 102 are anonymous in that publishers 101 do not necessarily know the number of subscribers 102 or their locations; and subscribers 102 do not necessarily know the locations of publishers 101.

Messaging system 104 acts as an intermediary between publisher 101 and subscriber 102, where messaging system 104 delivers messages published by publisher 101 to subscriber 102 that were requested by subscriber 102. A subscriber 102 may be any type of computing device (e.g., portable computing unit, personal digital assistant (PDA), smartphone, desktop computer system, workstation, Internet appliance and the like) configured with the capability of receiving messages from messaging system 104, such as messages published by computing devices 101A-101C. For example, subscriber 102 may be a computing device of a health care provider with a subscription to receive healthcare information, such as the healthcare information from the users of computing devices 101A-101C. A more detailed description of the hardware configuration of subscriber 102 is provided below in connection with FIG. 2.

System 100 is not to be limited in scope to any one particular network architecture. System 100 may include any number of computing devices 101, subscribers 102, networks 103, messaging systems 104 and sensors 105, 106.

Figure 2:
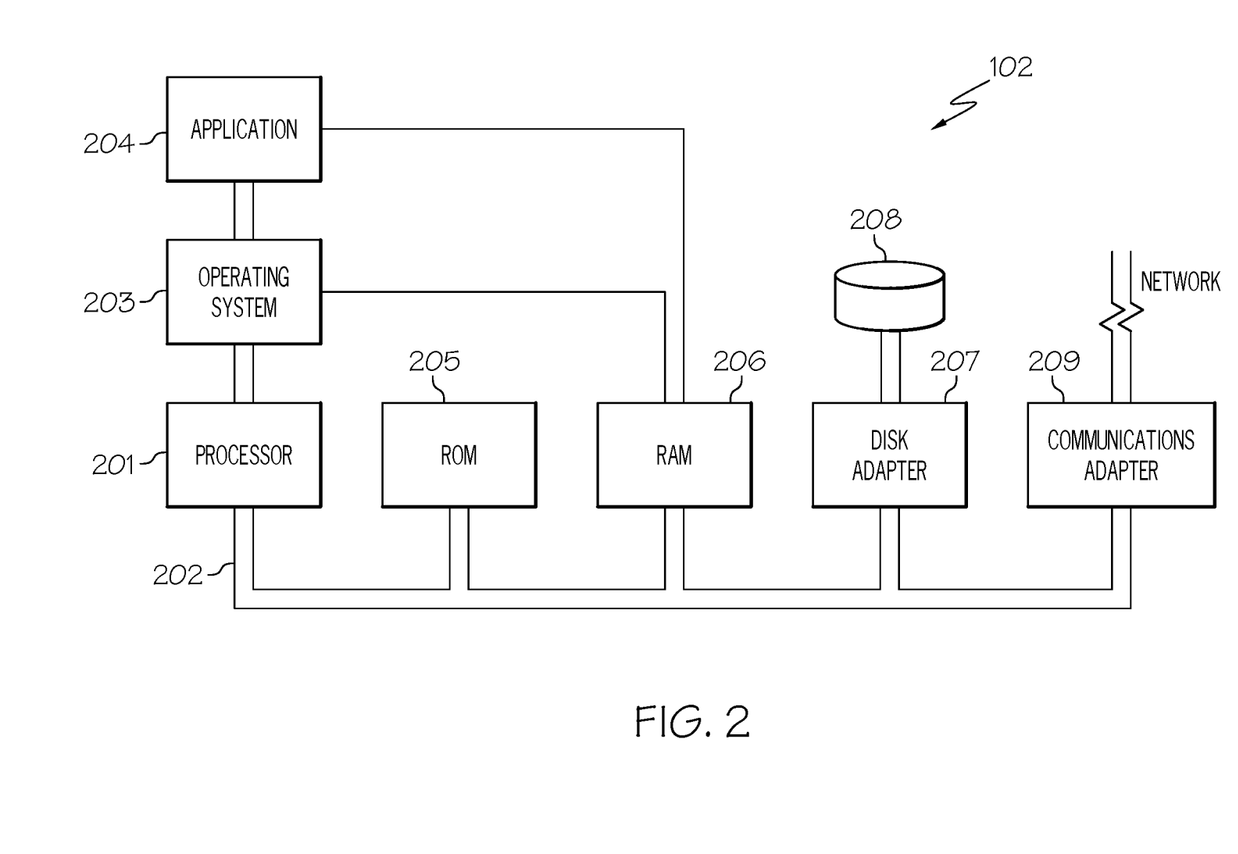
FIG. 2 illustrates a hardware configuration of a subscriber in accordance with an embodiment of the present invention.

Referring now to FIG. 2, FIG. 2 illustrates a hardware configuration of subscriber 102 (FIG. 1) which is representative of a hardware environment for practicing the present invention. Referring to FIG. 2, subscriber 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for enhancing the privacy of event sensor data, such as sensitive data from sensors 105, 106 (FIG. 1) published by computing devices 101 (FIG. 1) as discussed further below in connection with FIG. 3.

Referring again to FIG. 2, read-only memory ("ROM") 205 is coupled to system bus 202 and includes a basic input/output system ("BIOS") that controls certain basic functions of subscriber 102. Random access memory ("RAM") 206 and disk adapter 207 are also coupled to system bus 202. It should be noted that software components including operating system 203 and application 204 may be loaded into RAM 206, which may be subscriber's 102 main memory for execution. Disk adapter 207 may be an integrated drive electronics ("IDE") adapter that communicates with a disk unit 208, e.g., disk drive. It is noted that the program for enhancing the privacy of event sensor data, such as sensitive data from sensors 105, 106 published by computing devices 101 as discussed further below in connection with FIG. 3, may reside in disk unit 208 or in application 204.

Subscriber 102 may further include a communications adapter 209 coupled to bus 202. Communications adapter 209 interconnects bus 202 with an outside network (e.g., network 103 of FIG. 1) thereby enabling subscriber 102 to communicate with other devices (e.g., computing device 101).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, due to the rapid growth of sensor data from devices (e.g., wearable devices) used for the Internet of Things (IoT), there has been an increase in the potential for commercializing the personalized data streamed by these devices. Unfortunately, users have concerns about the privacy of the sensor data, which may include sensitive data (e.g., health details, location), thereby impeding the potential for commercialization. As a result, attempts have been made to safeguard the user's sensitive data, such as by storing the data in encrypted form. However, encryption requires computing and technical complexity overhead that is not economical in certain business cases. Alternatively, a user's sensitive data may be safeguarded by utilizing anonymous identifiers. For example, in some businesses, such as businesses in sales and marketing, it may not be necessary to store personally identifiable information, such as the user's name, address, social security number, etc., alongside the sensitive data. As a result, such businesses may employ anonymizing techniques, such as utilizing pseudonyms or anonymous identifiers, as opposed to the user's personal identifiable information, in connection with the sensitive data. However, with the proliferation of large volumes of sensor data (e.g., location, elevation, velocity, biological state (e.g., body temperature, heart rate)), a user can be "de-anonymized" by deducing the identity of the user from the patterns in the sensor data. As a result, there is not currently a means for ensuring the privacy of sensor data, such as data from wearable devices, by preventing the de-anonymizing of the user.

The principles of the present invention provide a means for enhancing the privacy of event sensor data, such as data from wearable devices, by preventing the de-anonymizing of the user by assigning a user with a temporary membership to a cohort to hide the identity of the user as discussed below in connection with FIG. 3.

Figure 3:
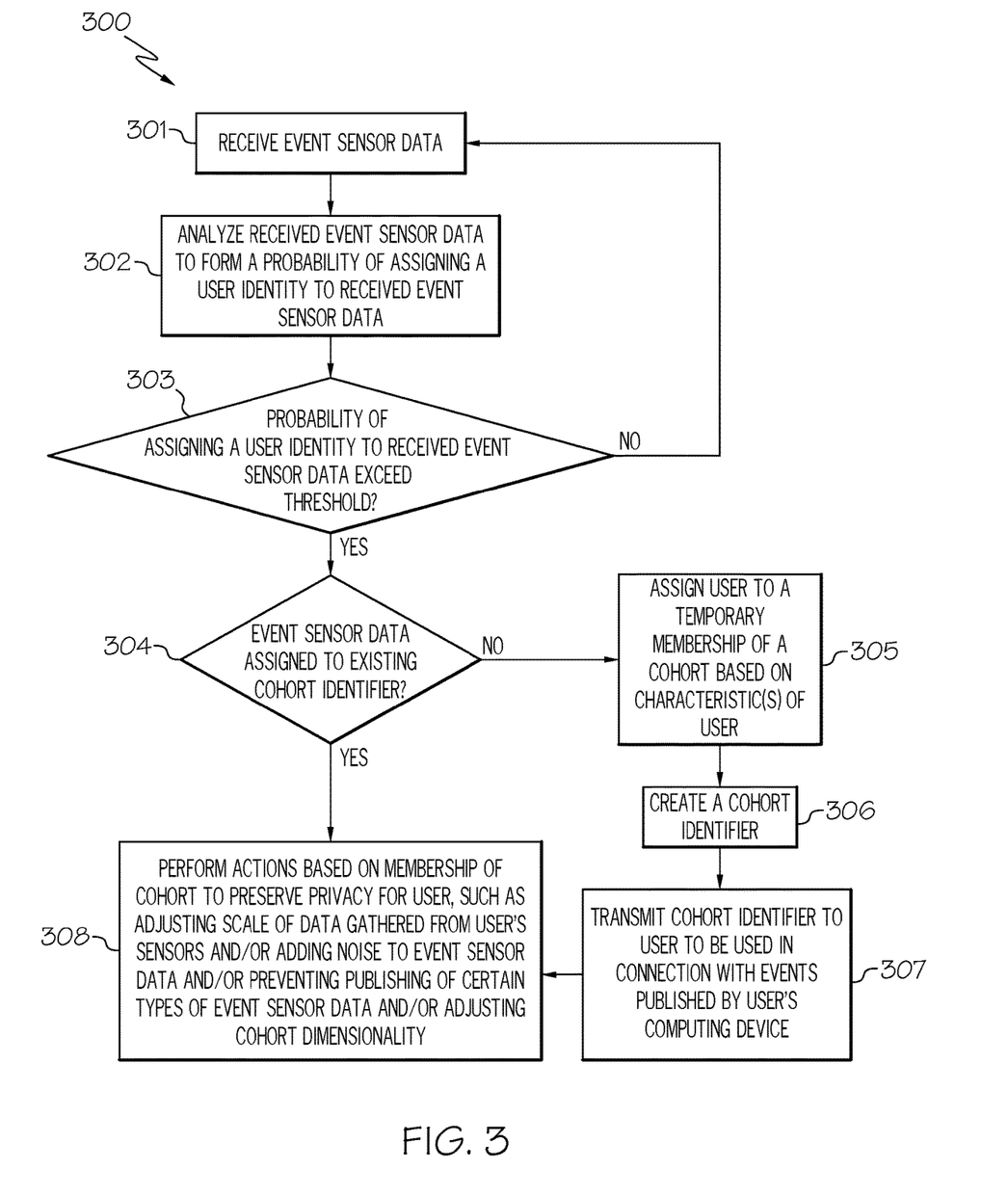
FIG. 3 is a flowchart of a method for enhancing the privacy of sensor data, such as data from wearable devices, by assigning a user with a temporary membership to a cohort to hide the identity of the user in accordance with an embodiment of the present invention.

FIG. 3 is a flowchart of a method 300 for enhancing the privacy of sensor data, such as data from wearable devices, by assigning a user with a temporary membership to a cohort to hide the identity of the user in accordance with an embodiment of the present invention.

Referring to FIG. 3, in conjunction with FIGS. 1-2, in step 301, subscriber 102 receives event sensor data, such as event sensor data subscribed by subscriber 102 to receive from messaging system 104 after being published by computing device 101. For example, subscriber 102 may provide a subscription to messaging system 104 that includes the type of event sensor data (e.g., body temperature, heart rate data) to be received from messaging system 104 after being published by computing device 101. As discussed above, such data may be generated from a wearable device worn by the user (e.g., user of computing device 101).

In step 302, subscriber 102 analyzes the received event sensor data to form a probability of assigning a user identity to the received event sensor data. That is, subscriber 102 analyzes the received event sensor data to determine the likelihood of identifying the user whose sensitive data is received, such as through random guessing. In one embodiment, such an analysis involves attempting to deduce the identity of the user from the patterns in the sensor data and the probability that such deduction results in a correct identification of the user. In another embodiment, such an analysis involves collecting social media information (e.g., social profiles) and attempting to match information from the received event sensor data with the data collected from social media information to determine a correct identification of the user.

In step 303, a determination is made by subscriber 102 as to whether the probability of assigning a user identity to the received event sensor data exceeds a threshold (e.g., 5%). In one embodiment, such a threshold is user specified. If the probability of assigning a user identity to the received event sensor data does not exceed the threshold, then subscriber 102 waits to receive further event sensor data in step 301.

If, however, the probability of assigning a user identity to the received event sensor data exceeds the threshold, then, in step 304, a determination is made by subscriber 102 as to whether the event sensor data is assigned to an existing identifier of a cohort. In one embodiment, event sensor data may include sensor data along with an identifier of a cohort if the publisher had previously received such an identifier from subscriber 102 as discussed further below.

A "cohort," as used herein, refers to a related group of users that share one or more common characteristics or experiences within a defined timespan. A user may be temporarily assigned to a cohort to hide the identity of the user. In one embodiment, such cohorts that are used herein are ephemeral. That is, such cohorts that are utilized by the principles of the present invention are temporary so as to increase the difficulty in de-anonymizing the user.

Furthermore, in one embodiment, the size of the cohort (i.e., the number of members and the data stored in connection with such members) is selected to ensure that the likelihood of identifying the user whose sensitive data is received, such as through random guessing, is less than or equal to the threshold discussed above in connection with step 303.

If the event sensor data does not include an identifier of a cohort, then, in step 305, subscriber 102 assigns the user (user of computing device 101) to a temporary membership of a cohort based on the characteristic(s) of the user to hide the identity of the user. For example, the user (e.g., user of computing device 101A) may be assigned a temporarily membership of a cohort with other members (users) (e.g., users of computing devices 101B, 101C) that published healthcare information over a defined timespan subscribed by subscriber 102.

In step 306, subscriber 102 creates a cohort identifier used to identify the cohort assigned to the user. In one embodiment, each member of the cohort receives a unique cohort identifier generated by subscriber 102. In one embodiment, subscriber 102 maintains a secure data structure that includes a listing of cohort identifiers for each cohort.

In step 307, subscriber 102 transmits the created cohort identifier to the user to be used in connection with the events published by the user's computing device 101. As result, when the publisher (i.e., computing device 101) publishes future event sensor data, such data will include the cohort identifier so that subscriber 102 will be able to determine if the user is a member of a cohort, and if so, which cohort.

After transmitting the created cohort identifier to the user, or if the event sensor data was previously assigned to an existing identifier of a cohort, then, in step 308, subscriber 102 performs actions based on the temporary membership to the cohort in order to ensure that the probability of assigning a user identity to the received event sensor data does not exceed a threshold. For example, actions include adjusting the scale of data gathered from sensors 105, 106. For instance, the location scale may be changed to be accurate within meters to hundreds of meters. In another example, a birthdate may be modified to be a range of days within the birth month (e.g., birthdate is between the $1^{st}$ and $15^{th}$ of the birth month). Such an adjustment of the scale may be communicated by subscriber 102 to computing device 101 so that computing device 101 can adjust the scaling of the data gathered from sensors 105, 106. Alternatively, subscriber 102 may adjust the scale of data upon receipt of the data from messaging system 104.

In another example, actions may also include the addition of noise to the event sensor data so as to increase the difficulty in de-anonymizing the user based on the event sensor data. In one embodiment, subscriber 102 and/or computing device 101 may add noise to the event sensor data so as to increase the difficultly in de-anonymizing the user based on the event sensor data. In the embodiment where computing device 101 adds noise to the event sensor data, subscriber 102 communicates with computing device 101 to add noise to the event sensor data.

In a further example, actions may include preventing the publishing of certain types of event sensor data. For example, subscriber 102 may communicate with computing device 101 to prevent the publishing of certain types of event sensor data (e.g., location, time) that may contribute to identifying the identity of the user in light of other information published by computing device 101.

In another example, actions may include adjusting the cohort dimensionality. Adjusting the cohort dimensionality may involve reassigning one or more users, including the user in question or a different user, to a different cohort so as to ensure that the probability of assigning a user identity to the received event sensor data does not exceed a threshold. Adjusting the cohort dimensionality may also involve creating a new cohort for the user in order to safeguard their privacy (i.e., in order to ensure that the probability of assigning a user identity to the received event sensor data does not exceed a threshold). Furthermore, adjusting the cohort dimensionality may involve terminating the cohort after the user is reassigned to another cohort.

In this manner, by performing such actions as well as assigning a user to a temporary membership of an ephemeral cohort, privacy of the user's sensitive data is enhanced by hiding the user's identity as well as ensuring that the probability of assigning a user identity to the received event sensor data does not exceed a threshold.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for enhancing privacy of event sensor data, the method comprising:
   receiving event sensor data;
   analyzing said received event sensor data to form a probability of assigning a user identity to said received event sensor data;
   assigning, by a processor, a user of said event sensor data with a temporary membership to a cohort to hide an identity of said user in response to said probability of assigning said user identity to said received event sensor data exceeding a threshold and in response to said received event sensor data not being assigned to an existing identifier of any cohort; and
   performing actions, by said processor, based on said temporary membership to said cohort in response to said probability of assigning said user identity to said received event sensor data exceeding said threshold.

2. The method as recited in claim 1, wherein said actions comprise one or more of the following: adjusting scale of data gathered from one or more sensors, adding noise to event sensor data, preventing publishing of certain types of event sensor data and adjusting cohort dimensionality.

3. The method as recited in claim 2, wherein said cohort dimensionality is adjusted based on reassigning said user or another user with said temporary membership to said cohort to have a temporary membership with a different cohort.

4. The method as recited in claim 1 further comprising:
   creating a cohort identifier in response to said received event sensor data not being assigned to said existing identifier of any cohort.

5. The method as recited in claim 4 further comprising:
   transmitting said cohort identifier to a user's computing device to be used in connection with published events by said user's computing device.

6. The method as recited in claim 1, wherein said event sensor data is generated from a wearable device.

7. The method as recited in claim 1, wherein said event sensor data is received by a subscriber with a subscription to receive said event sensor data.

8. The method as recited in claim 1, wherein said user is assigned temporary membership to said cohort based on one or more characteristics of said user.

9. A computer program product for enhancing privacy of event sensor data, the computer program product comprising a computer readable storage medium having program code embodied therewith, the program code comprising the programming instructions for:
   receiving event sensor data;
   analyzing said received event sensor data to form a probability of assigning a user identity to said received event sensor data;
   assigning a user of said event sensor data with a temporary membership to a cohort to hide an identity of said user in response to said probability of assigning said user identity to said received event sensor data exceeding a threshold and in response to said received event sensor data not being assigned to an existing identifier of any cohort; and
   performing actions based on said temporary membership to said cohort in response to said probability of assigning said user identity to said received event sensor data exceeding said threshold.

10. The computer program product as recited in claim 9, wherein said actions comprise one or more of the following: adjusting scale of data gathered from one or more sensors, adding noise to event sensor data, preventing publishing of certain types of event sensor data and adjusting cohort dimensionality.

11. The computer program product as recited in claim 10, wherein said cohort dimensionality is adjusted based on reassigning said user or another user with said temporary membership to said cohort to have a temporary membership with a different cohort.

12. The computer program product as recited in claim 9, wherein the program code further comprises the programming instructions for:
   creating a cohort identifier in response to said received event sensor data not being assigned to said existing identifier of any cohort.

13. The computer program product as recited in claim 12, wherein the program code further comprises the programming instructions for:
   transmitting said cohort identifier to a user's computing device to be used in connection with published events by said user's computing device.

14. The computer program product as recited in claim 9, wherein said event sensor data is generated from a wearable device.

15. The computer program product as recited in claim 9, wherein said event sensor data is received by a subscriber with a subscription to receive said event sensor data.

16. The computer program product as recited in claim 9, wherein said user is assigned temporary membership to said cohort based on one or more characteristics of said user.

17. A system, comprising:
a memory unit for storing a computer program for enhancing privacy of event sensor data; and
a processor coupled to the memory unit, wherein the processor is configured to execute the program instructions of the computer program comprising:
receiving event sensor data;
analyzing said received event sensor data to form a probability of assigning a user identity to said received event sensor data;
assigning a user of said event sensor data with a temporary membership to a cohort to hide an identity of said user in response to said probability of assigning said user identity to said received event sensor data exceeding a threshold and in response to said received event sensor data not being assigned to an existing identifier of any cohort; and
performing actions based on said temporary membership to said cohort in response to said probability of assigning said user identity to said received event sensor data exceeding said threshold.

18. The system as recited in claim 17, wherein said actions comprise one or more of the following: adjusting scale of data gathered from one or more sensors, adding noise to event sensor data, preventing publishing of certain types of event sensor data and adjusting cohort dimensionality.

19. The system as recited in claim 18, wherein said cohort dimensionality is adjusted based on reassigning said user or another user with said temporary membership to said cohort to have a temporary membership with a different cohort.

20. The system as recited in claim 17, wherein the program instructions of the computer program further comprise:
creating a cohort identifier in response to said received event sensor data not being assigned to said existing identifier of any cohort.

21. The system as recited in claim 20, wherein the program instructions of the computer program further comprise:
transmitting said cohort identifier to a user's computing device to be used in connection with published events by said user's computing device.

22. The system as recited in claim 17, wherein said event sensor data is generated from a wearable device.

23. The system as recited in claim 17, wherein said event sensor data is received by a subscriber with a subscription to receive said event sensor data.

24. The system as recited in claim 17, wherein said user is assigned temporary membership to said cohort based on one or more characteristics of said user.

* * * * *